United States Patent
Kim et al.

(10) Patent No.: US 11,955,045 B2
(45) Date of Patent: Apr. 9, 2024

(54) DISPLAY DEVICE AND CONTROL METHOD THEREFOR

(71) Applicant: SAMSUNG ELECTRONICS CO., LTD., Suwon-si (KR)

(72) Inventors: Jihye Kim, Suwon-si (KR); Jiyong Park, Suwon-si (KR); Younghoon Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/115,480

(22) Filed: Feb. 28, 2023

(65) Prior Publication Data

US 2023/0206810 A1 Jun. 29, 2023

Related U.S. Application Data

(63) Continuation of application No. PCT/KR2020/011667, filed on Sep. 1, 2020.

(30) Foreign Application Priority Data

Aug. 28, 2020 (KR) .................. 10-2020-0109606

(51) Int. Cl.
G09G 3/20 (2006.01)
G09G 3/32 (2016.01)

(52) U.S. Cl.
CPC ............. *G09G 3/2003* (2013.01); *G09G 3/32* (2013.01); *G09G 2320/0242* (2013.01);
(Continued)

(58) Field of Classification Search
CPC ............................................. G09G 2320/0233
See application file for complete search history.

(56) References Cited

U.S. PATENT DOCUMENTS 7,345,660 B2 3/2008 Mizukoshi et al.
8,830,148 B2 9/2014 Segawa et al.
(Continued)

FOREIGN PATENT DOCUMENTS

JP 4865986 B2 2/2012
JP 5326788 B2 10/2013
(Continued)

OTHER PUBLICATIONS

W. Greenwald, "A Closer Look at Samsung's The Wall MicroLED TV System", PC Magazine, Dec. 4, 2019, (12 pages total).
(Continued)

*Primary Examiner* — Nan-Ying Yang
(74) *Attorney, Agent, or Firm* — Sughrue Mion, PLLC

(57) ABSTRACT

A display device includes a communicator; a memory; a display panel including a plurality of display modules; and one or more processors. The processor receives position information and corrected pixel value of a first area in a first display module; identifies a pixel corresponding to the first area based on the position information; obtains a correction coefficient corresponding to the identified pixel based on the corrected pixel value and an output pixel value of the identified pixel; obtains correction coefficients corresponding to each of a plurality of remaining pixels based on the correction coefficient and a distance between the identified pixel and each of the remaining pixels and stores same in a memory; processes an input image based on the correction coefficients, and controls the display panel to display the processed input image. The device thereby improves display uniformity between display modules more effectively.

18 Claims, 10 Drawing Sheets

(52) U.S. Cl.
CPC .............. *G09G 2320/0666* (2013.01); *G09G 2320/0686* (2013.01); *G09G 2354/00* (2013.01); *G09G 2360/04* (2013.01)

(56) References Cited

U.S. PATENT DOCUMENTS

| | | |
|---|---|---|
| 10,147,392 B2 | 12/2018 | Jung et al. |
| 11,176,865 B2 | 11/2021 | Beon et al. |
| 11,183,101 B2 | 11/2021 | Orio et al. |
| 11,270,665 B2 | 3/2022 | Lee |
| 2004/0150592 A1 | 8/2004 | Mizukoshi et al. |
| 2017/0103694 A1 | 4/2017 | Kim et al. |
| 2018/0061298 A1* | 3/2018 | Cho .................. G09G 3/3666 |
| 2018/0144716 A1* | 5/2018 | Jung .................. G09G 3/006 |
| 2018/0246326 A1* | 8/2018 | Moon ................ A63F 13/493 |
| 2018/0342224 A1 | 11/2018 | Beon et al. |
| 2019/0213941 A1 | 7/2019 | Beon et al. |
| 2020/0279519 A1 | 9/2020 | Orio et al. |
| 2021/0233491 A1 | 7/2021 | Lee |
| 2023/0206810 A1* | 6/2023 | Kim ...................... G09G 3/32 |
| | | 345/691 |

FOREIGN PATENT DOCUMENTS

| | | |
|---|---|---|
| JP | 2016-9136 A | 1/2016 |
| JP | 2018-180423 A | 11/2018 |
| KR | 10-2017-0035527 A | 3/2017 |
| KR | 10-2017-0066772 A | 6/2017 |
| KR | 10-2018-0050054 A | 5/2018 |
| KR | 10-2018-0058048 A | 5/2018 |
| KR | 10-1928426 B1 | 12/2018 |
| KR | 10-2020-0075879 A | 6/2020 |
| WO | 2016/144501 A1 | 9/2016 |

OTHER PUBLICATIONS

G. Lu, "The Wall Luxury: A Samsung 292-Inch 8K TV That Puts The 'Cinema' In Home Cinema", Boss Hunting, Feb. 21, 2020, (3 pages total).

International Search Report (PCT/ISA/210) dated May 25, 2021 issued by the International Searching Authority in International Application No. PCT/KR2020/011667.

Written Opinion (PCT/ISA/237) dated May 25, 2021 issued by the International Searching Authority in International Application No. PCT/KR2020/011667.

"Indoor The Wall IWR", Sep. 1, 2019, (12 pages total).

* cited by examiner

BEFORE CORRECTION    EFFECT

AFTER CORRECTION

EFFECT

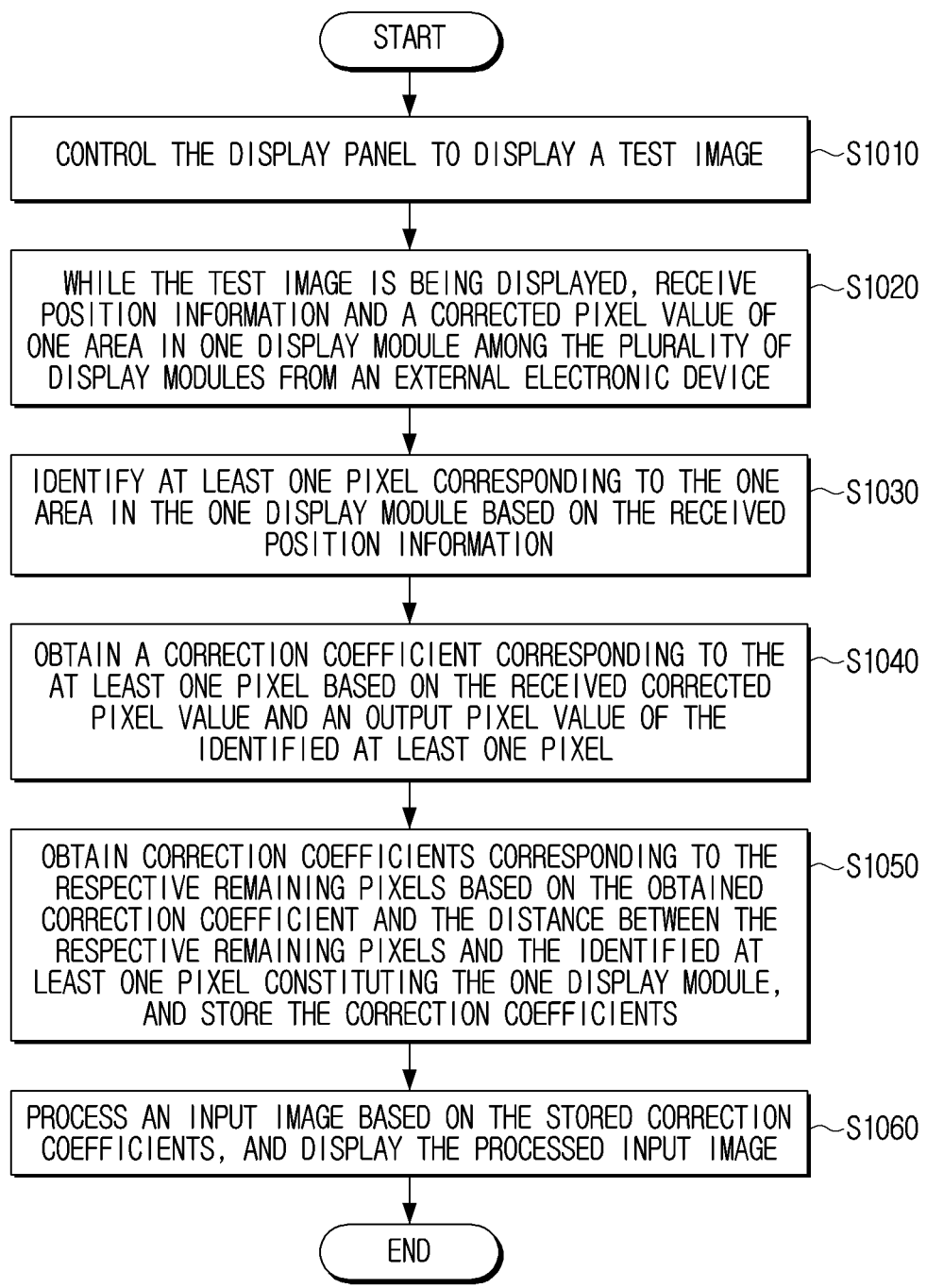

DISPLAY DEVICE AND CONTROL METHOD THEREFOR

CROSS-REFERENCE TO RELATED APPLICATIONS

This application is a continuation bypass of International Patent Application No. PCT/KR2020/011667, filed on Sep. 1, 2020, with the World Intellectual Property Organization, which is based on and claims priority to Korean Patent Application No. 10-2020-0109606, filed on Aug. 28, 2020, in the Korean Intellectual Property Office, the disclosures of each of which are incorporated by reference herein in their entireties.

BACKGROUND

1. Field

The disclosure relates to a display device and a control method therefor, and more particularly, to an electronic device obtaining a correction coefficient, a display device including a display module, and a control method therefor.

2. Description of Related Art

As electronic technologies have been developed recently, various electronic devices are also being developed. In particular, recently, a display device that provides a large-size screen using a plurality of display modules in combination is being developed. Such a display device can give visual satisfaction to a user by displaying an image through a large-size screen.

However, in a manufacturing process of display modules, the characteristics of LED elements constituting display modules cannot be all the same, and thus deviation and non-uniformity occur between modules when outputting an image. Also, according to the installation and driving environment of a display device, the characteristics of each of LED elements change differently, and thus deviation and non-uniformity occur between modules when outputting an image.

In the past, uniformity was improved by reducing deviation between adjacent modules in module units, but in such a method, there were a problem and inconvenience in a need to adjust all modules constituting a display device.

SUMMARY

For resolving the aforementioned problem, the disclosure provides a display device that obtains a correction coefficient for compensating non-uniformity between modules occurring according to the characteristics of LED elements, and a control method therefor.

In accordance with certain embodiments of the present disclosure, a display device is provided. The device includes a communicator, a memory, a display panel including a plurality of display modules, and a processor. The processor is configured to control the display panel to display a test image. The processor is further configured to, while the test image is being displayed, receive position information and a corrected pixel value of a first area in a first display module among the plurality of display modules from an external electronic device through the communicator. The processor is further configured to, based on the received position information, identify at least one pixel corresponding to the first area in the first display module. The processor is further configured to obtain a correction coefficient corresponding to the at least one pixel based on the received corrected pixel value and an output pixel value of the identified at least one pixel. The processor is further configured to obtain correction coefficients corresponding to each of a plurality of remaining pixels in the first display module based on the obtained correction coefficient and a distance between the respective remaining pixels and the identified at least one pixel. The processor is further configured to store the correction coefficients in the memory. The processor is further configured to process an input image based on the stored correction coefficients. The processor is further configured to control the display panel to display the processed input image.

In accordance with other embodiments of the present disclosure, a control method is provided for a display device including a display panel. The method includes controlling the display panel to display a test image. The method further includes, while the test image is being displayed, receiving position information and a corrected pixel value of a first area in a first display module among the plurality of display modules from an external electronic device. The method further includes, based on the received position information, identifying at least one pixel corresponding to the first area in the first display module. The method further includes obtaining a correction coefficient corresponding to the at least one pixel based on the received corrected pixel value and an output pixel value of the identified at least one pixel. The method further includes obtaining correction coefficients corresponding to each of a plurality of remaining pixels in the first display module based on the obtained correction coefficient and a distance between the respective remaining pixels and the identified at least one pixel. The method further includes storing the correction coefficients. The method further includes processing an input image based on the stored correction coefficients. The method further includes displaying the processed input image.

According to various embodiments of the disclosure such as described above, a display device can improve uniformity between modules. In particular, the display device may perform adjustment only for some modules or obtain correction coefficients only for some pixels, instead of adjusting the entire plurality of display modules or obtaining correction coefficients corresponding to all of the respective pixels included in the display device. Accordingly, the display device can improve uniformity more effectively.

BRIEF DESCRIPTION OF THE DRAWINGS

Features and aspects of certain exemplary embodiments of the disclosure will be described below with reference to the accompanying drawings, in which like reference numerals denote like elements, and wherein:

FIG. 10 is a flow chart for illustrating a control method for a display device according to an embodiment of the disclosure.

DETAILED DESCRIPTION

Figure 1:
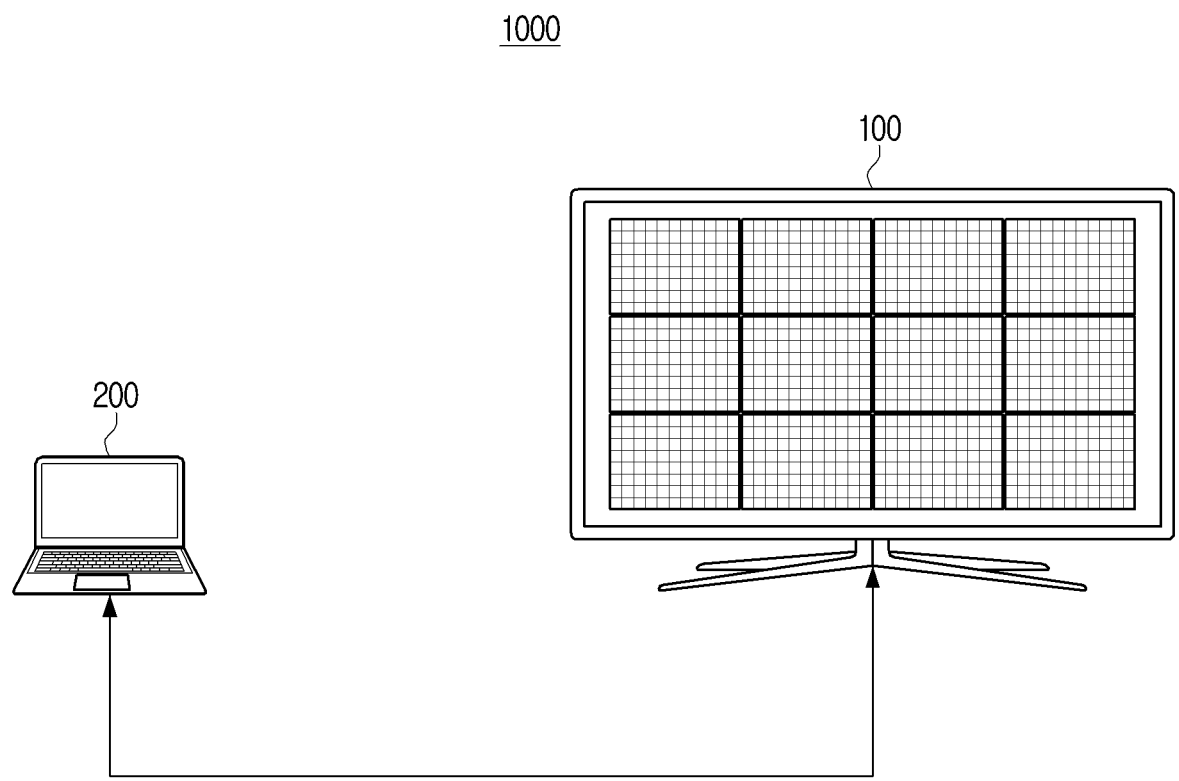
FIG. 1 is a diagram for illustrating a configuration of a display device correction system according to an embodiment of the disclosure.

First, terms used in this specification will be described briefly, and then the disclosure will be described in detail.

As terms used in the embodiments of the disclosure, general terms that are currently used widely were selected as much as possible, in consideration of the functions described in the disclosure. However, the terms may vary depending on the intention of those skilled in the art, previous court decisions, or emergence of new technologies. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, or alternatives of the embodiments included in the ideas and the technical scopes disclosed herein. Additionally, in case it is determined that in describing embodiments, detailed explanation of related known technologies may unnecessarily confuse the gist of the disclosure, the detailed explanation will be omitted.

In addition, terms such as 'the first' and 'the second' may be used to describe various components, but these components are not limited by the aforementioned terms. The terms are used only for the purpose of distinguishing one component from another component.

Further, singular expressions include plural expressions, unless defined plainly differently in the context. Also, in the disclosure, terms such as "include" and "comprise" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, in the disclosure, "a module" or "a part" performs at least one function or operation, and may be implemented as hardware or software, or as a combination of hardware and software. Also, a plurality of "modules" or a plurality of "parts" may be integrated into at least one module and implemented as at least one processor (not shown), except "a module" or "a part" that needs to be implemented as specific hardware.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

FIG. 1 is a diagram for illustrating a configuration of a display device correction system according to an embodiment of the disclosure.

Referring to FIG. 1, a display device correction system 1000 according to an embodiment of the disclosure may include a display device 100 and an electronic device 200.

Here, the display device 100 may include a plurality of display modules. Here, each display module may be physically connected to form one display. Detailed explanation regarding the display device 100 will be described below with reference to FIG. 2.

The display device 100 according to an embodiment of the disclosure may display a test image. Here, the test image may be an image including a specific object, or a red, green, blue, or white image in full color for setting pixel values of a plurality of respective pixels included in the display device 100.

Referring to FIG. 1, the display device 100 according to an embodiment of the disclosure may include a display panel including a plurality of display modules (or a module-type display device) arranged in a matrix form. Here, each of the plurality of display modules may include a plurality of pixels arranged in a matrix form. In particular, each of the plurality of display modules according to an embodiment of the disclosure may be implemented as an LED display module including inorganic light emitting diodes (LEDs), and may be implemented as an LED display module including a plurality of pixels each including a red (R) sub pixel, a green (G) sub pixel, and a blue (B) sub pixel.

According to the driving of the display device 100, a degree of aging of each of the plurality of display modules may be different. Here, aging may refer to a degradation phenomenon that is generated according to the driving time or the use time of each of the plurality of display modules. Aging may be expressed as a degree of change to the lifespan of the module, or to the persisting period as a current flows in each of the plurality of display modules and the light emitting diodes emit light, among other possibilities.

Even if each of the plurality of display modules is generated according to the same manufacturing steps and processes, each of the plurality of display modules does not have the same durability and persisting period. Deviation within an error range may exist in the durability among the plurality of display modules. Accordingly, even if the driving time of each of the plurality of display modules according to the driving of the display device 100 is the same, the aging degree of each of the plurality of display modules is not the same.

Also, according to the driving environment of the display device 100, the aging degree or the degree of change of the diode characteristics of each of the plurality of display modules may vary. For example, a display module arranged in the outermost part and a display module arranged in a position corresponding to the center of the display panel among the plurality of display modules may be exposed to different temperature and humidity environments. Accordingly, the aging degree of the display module arranged in the outermost part and the aging degree of the remaining display modules within the display panel may be different.

As another example, a display module arranged to be adjacent to the power supply part included in the display device 100 among the plurality of display modules may be frequently exposed to a relatively higher temperature than the remaining display modules. Accordingly, the aging degree of the display module arranged to be adjacent to the power supply part may be relatively higher than the aging degree of the remaining display modules. That is, the remaining lifespan of the display module arranged to be adjacent to the power supply part may be relatively lower than the remaining lifespan of the remaining display modules.

As still another example, depending on the installation environment of the display device 100, a case wherein metal having high thermal conductivity (e.g., iron, aluminum, etc.) is arranged on the rear surface of the display device 100 may be assumed. In this case, when the display device 100 is driven, a display module arranged to be adjacent to the metal among the plurality of display modules may operate at a relatively lower temperature than the remaining display modules. In this case, a similar effect to a case wherein the metal operates as a cooler can be exerted. Accordingly, the aging degree of the display module arranged to be adjacent to the metal may be relatively lower than the aging degree of the remaining display modules.

As the operation time of the display device 100 increases, the difference between the aging degree among the plurality of display modules gradually increases, and due to this, there is a problem that non-uniformity among the plurality of display modules occurs. For example, in case the display device 100 outputs a white image in full color, a display module exposed to a relatively higher temperature for a long time may output the white image at a color temperature that is relatively redder or luminance that is relatively lower than the remaining display modules. As another example, in case the display device 100 outputs a white image in full color, a display module exposed to a relatively lower temperature for a long time may output the white image at a color temperature that is relatively bluer or luminance that is relatively higher than the remaining display modules. However, this is merely an example, and as the aging degree among the display modules is different, a user may feel that each of the plurality of display modules included in the display device 100 does not output a white image at a unified color temperature and luminance, but any one display module outputs a white image at a color temperature that is relatively redder, and another display module outputs a white image at a color temperature that is relatively bluer. That is, non-uniformity may occur among the plurality of display modules.

Hereinafter, a method of obtaining correction coefficients for effectively resolving non-uniformity by using the display device 100 and the electronic device 200 will be described based on various embodiments of the disclosure.

Referring to FIG. 1, the electronic device 200 according to an embodiment of the disclosure may receive a user input for correcting the pixel values of the plurality of respective display modules included in the display panel, and transmit position information and a corrected pixel value of one area in the display module corresponding to the user input among the plurality of display modules to the display device 100.

Then, the display device 100 may identify one area in any one display module among the plurality of display modules based on the position information received from the electronic device 200, and correct the pixel value of the pixel included in the identified one area and the pixel values of the respective pixels included in the remaining areas in the any one display module based on the corrected pixel value. Detailed explanation in this regard will be described with reference to FIG. 2.

Figure 2:
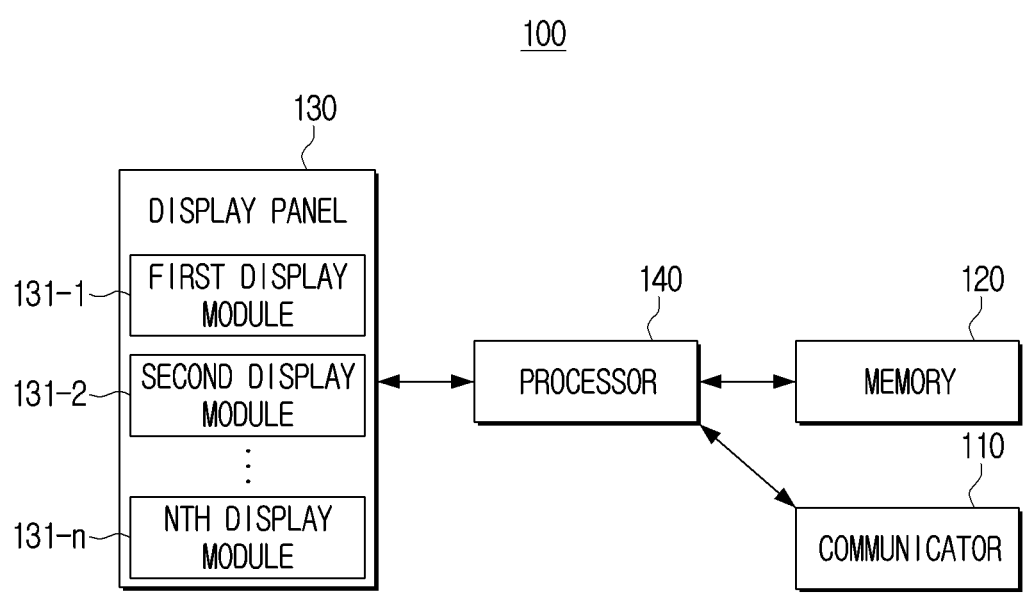
FIG. 2 is a block diagram illustrating a configuration of a display device according to an embodiment of the disclosure.

FIG. 2 is a block diagram illustrating a configuration of a display device according to an embodiment of the disclosure.

Referring to FIG. 2, the display device 100 includes a communicator 110, a memory 120, a display panel 130, and a processor 140.

The display device 100 may be implemented as a TV, but is not limited thereto. For example, any device equipped with a display function such as a video wall, a large format display (LFD), digital signage, a digital information display (DID), a projector display, etc. can be applied as the display device 100 without limitation. Also, the display device 100 may be implemented as displays in various forms such as a liquid crystal display (LCD), organic light-emitting diodes (OLED), liquid crystal on silicon (LCoS), digital light processing (DLP), a quantum dot (QD) display panel, quantum dot light-emitting diodes (QLED), micro light-emitting diodes (μLED), mini LED, etc. The display device 100 may also be implemented as a touch screen combined with a touch sensor, a flexible display, a rollable display, a 3D display, a display to which a plurality of display modules are physically connected, etc.

The display device 100 according to an embodiment of the disclosure may be one of a plurality of display devices forming a modular display device, and the display panel 130 may include a plurality of display modules.

The communicator 110 according to an embodiment of the disclosure may perform communication with an external electronic device 200. According to an embodiment, the communicator 110 may receive input of various types of data and images from the external electronic device 200 (e.g., an operation device, a source device), an external storage medium (e.g., a USB memory), an external server (e.g., cloud storage and/or cloud-based software), etc. through communication methods such as Wi-Fi based on AP (Wi-Fi, a wireless LAN network), Bluetooth®, Zigbee®, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), optical, coaxial, etc. In particular, the communicator 110 according to an embodiment may receive position information and a corrected pixel value of one area in one display module among the plurality of display modules from the external electronic device 200.

The memory 120 stores various data for driving the display device 100, an operating system (O/S) software module, and various data such as various kinds of multimedia contents. The memory 120 may be implemented as a non-volatile memory such as a hard disc, a solid state drive (SSD), a flash memory (ex. a NOR or NAND type flash memory, etc.), and the like. As another example, the memory 120 can be implemented as a storage space included inside the processor 140 rather than as a separate component, as will be described below.

In particular, the memory 120 according to an embodiment of the disclosure may store basic correction coefficients corresponding to the plurality of respective pixels included in the display panel 130.

For example, the memory 120 may store basic correction coefficients corresponding to the respective pixels constituting the plurality of respective display modules. As an example, in case a pixel is implemented as a self-luminous pixel (e.g., an LED pixel), the memory 120 may store basic correction coefficients corresponding to the plurality of respective LED pixels such that the plurality of LED pixels have the same characteristics (the color coordinate, the luminance, etc.) as much as possible for uniformity.

For example, the basic correction coefficients may be in the form of a 3×3 matrix for each of R/G/B elements, and the processor 140 can improve uniformity among the plurality of pixels and the plurality of display modules by applying different correction coefficients to the respective pixels.

The display panel 130 according to an embodiment of the disclosure may include a plurality of display modules. The display panel 130 may be implemented as a display including self-luminous elements, or a display including non-self-luminous elements and a backlight. For example, the display panel 130 may be implemented as displays in various forms such as a liquid crystal display (LCD), an organic light emitting diodes (OLED) display, light emitting diodes (LED), a micro LED, a mini LED, a plasma display panel (PDP), a quantum dot (QD) display, quantum dot light-emitting diodes (QLED), etc. Inside the display panel 130, driving circuits that may be implemented in forms such as an a-si TFT, a low temperature poly silicon (LTPS) TFT, an organic TFT (OTFT), etc., a backlight unit, etc. may also be included. The display panel 130 may be implemented as a touch screen combined with a touch sensor, a flexible display, a rollable display, and a 3D display, and implemented as a display to which a first display module 131-1 to an nth display module 131-n are physically connected.

The processor 140 according to an embodiment of the disclosure controls the overall operations of the display device 100. Here, the processor 140 may include one or a plurality of processors. Specifically, the processor 140 may perform the operations of the display device 100 according to the various embodiments of the disclosure by executing at least one instruction stored in the memory 120.

According to an embodiment, the processor 140 may be implemented as a digital signal processor (DSP) processing digital image signals, a microprocessor, a graphics processing unit (GPU), an artificial intelligence (AI) processor, a neural processing unit (NPU), and a time controller (TCON). However, the disclosure is not limited thereto, and the processor 140 may include one or more of a central processing unit (CPU), a micro controller unit (MCU), a micro processing unit (MPU), a controller, an application processor (AP), or a communication processor (CP), and an ARM processor, or may be defined by the terms. Also, the processor 140 may be implemented as a system on chip (SoC) having a processing algorithm stored therein or large scale integration (LSI), or implemented in the form of an application specific integrated circuit (ASIC) or a field programmable gate array (FPGA).

The processor 140 may control hardware or software components connected to the processor 140 by driving the operating system or an application program, and perform various kinds of data processing and operations. Also, the processor 140 may load an instruction or data received from at least one of other components on the volatile memory and process them, and store various data in the non-volatile memory.

The processor 140 according to an embodiment of the disclosure may obtain an output image by applying the basic correction coefficients stored in the memory 120 to an image signal corresponding to an input image. Then, the processor 140 may control the display panel 130 to display the obtained output image. However, as the aging degree of each of the plurality of display modules 131-1, . . . , 131-n is different, non-uniformity may occur. Explanation in this regard will be described with reference to FIG. 3.

Figure 3:
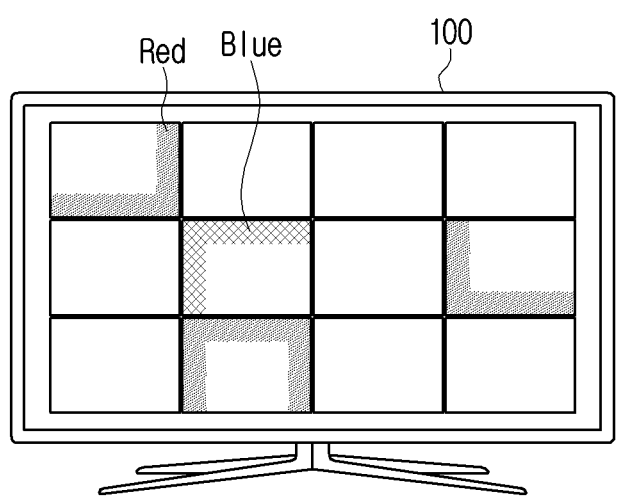
FIG. 3 is a diagram for illustrating non-uniformity according to an embodiment of the disclosure.

FIG. 3 is a diagram for illustrating non-uniformity according to an embodiment of the disclosure.

Referring to FIG. 3, it illustrates an example case wherein the display device 100 outputs a white image as a test image. As each of the plurality of display modules 131-1, . . . , 131-n is driven for a long time in a temperature or humidity environment different from each other, the aging degree may be different. In this case, as the aging degree of each of the plurality of display modules 131-1, . . . , 131-n is different, each of the plurality of display modules 131-1, . . . , 131-n does not output a white image at a unified color temperature and luminance, but any one display module may output a white image at a color temperature that is relatively redder, and another display module may output a white image at a color temperature that is relatively bluer.

FIG. 3 assumes that deviation of color or luminance occurs in a seam area between the display modules, or an edge area of a display module, for the convenience of explanation, but this is merely an example, and the disclosure is not limited thereto.

For example, the white image output by some LED pixels arranged in the center among the plurality of pixels included in a display module may be in a state wherein a color temperature that is relatively redder is emphasized. As another example, the white image output by some LED pixels arranged in the right edge area among the plurality of pixels included in a display module may be in a state wherein a color temperature that is relatively bluer is emphasized.

Figure 4:
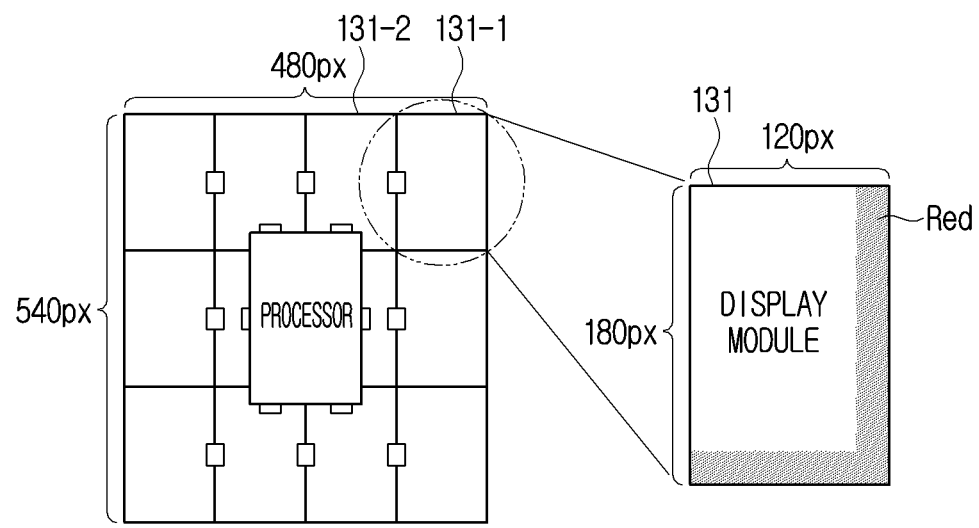
FIG. 4 is a diagram for illustrating a display module according to an embodiment of the disclosure.

FIG. 4 is a diagram for illustrating a display module 131 according to an embodiment of the disclosure.

Referring to FIG. 4, the display module 131 according to an embodiment may include a plurality of pixels arranged in a matrix form, and each of the plurality of pixels may include a red (R) sub pixel, a green (G) sub pixel, and a blue (B) sub pixel. However, this is merely an example, and as another example, each of the plurality of pixels can further include a white (W) sub pixel or a yellow (Y) sub pixel, etc.

According to an embodiment of the disclosure, the display device 100 may include a plurality of display modules 131-1, . . . , 131-n. For example, the display device 100 may include a plurality of display modules 131-1, . . . , 131-n in a 4×3 arrangement. The plurality of display modules 131-1, . . . , 131-n may be arranged in a matrix form (e.g., M×N, where M and N are natural numbers). Specifically, the matrix may not only be in a square form (e.g., M=N: a 16×16 arrangement, a 24×24 arrangement, etc.), but it may also be in a form of a different arrangement from this (e.g., M N).

For the convenience of explanation, FIG. 4 illustrates an example display module 131 which includes 21,600 pixels arranged in a 120×180 form, but this is merely an example, and the disclosure is not limited thereto. For example, the display module 131 may include 43,200 pixels arranged in a 240×180 form. Also, the size and the ratio of the display module 131 can be changed in various ways according to the number of the pixels included in the display module 131 and the distances among the pixels (e.g., the pixel pitch).

The number of the plurality of display modules 131-1, . . . , 131-n constituting the display device 100 can also be changed in various ways according to the manufacturing purpose of the manufacturer, the resolution of the display device 100, etc. For example, if a display module 131 including 21,600 pixels arranged in a 120×180 form is assumed, the display device 100 may include eight sub cabinets each including twelve display modules 131, and output a content of an FHD resolution (1920×1080), or may include one hundred and twenty-eight sub cabinets, and output a content of an 8K resolution (7680×4320). However, this is merely an example, and the disclosure is not limited thereto.

As another example, if a case wherein the display module 131 includes 43,200 pixels arranged in a 240×180 form is assumed, the display device 100 may include four sub cabinets each including twelve display modules 131, and output a content of an FHD resolution (1920×1080), and may include sixty-four sub cabinets, and output a content of an 8K resolution (7680×4320).

Referring to FIG. 4, it illustrates an example case wherein degradation and distortion occur in one area in the display module 131. Here, the degradation and the distortion may include a case wherein, according to the consumption degree, the remaining lifespan, or the aging degree of an LED pixel included in one area, the LED pixel outputs a different pixel value (e.g., a luminance value or a color value) from the remaining LED pixels. For example, as the LED pixels included in the right and lower edge areas in the display module 131 are exposed to a relatively higher temperature for a long time than the LED pixels included in the remaining areas, the LED pixels may include pixel values wherein a red color temperature is emphasized when outputting a white image. Due to this, there is a problem that non-uniformity occurs among the plurality of display modules 131-1, . . . , 131-n.

The disclosure will now discuss various embodiments or effects for resolving such non-uniformity.

Figure 5:
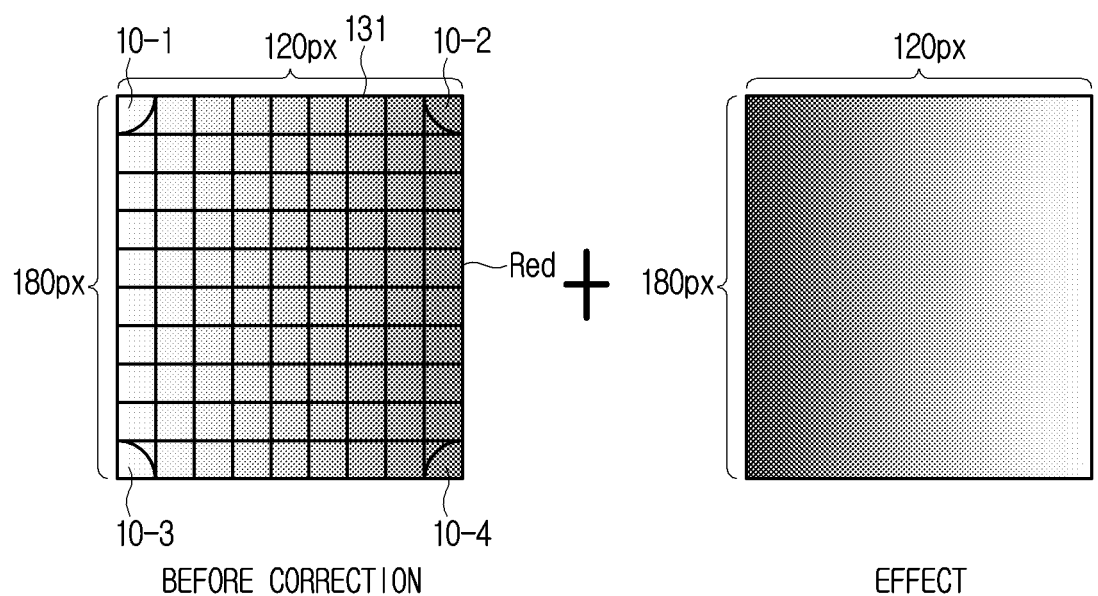
FIG. 5 is a diagram for illustrating a gradation effect according to an embodiment of the disclosure.
Figure 5:
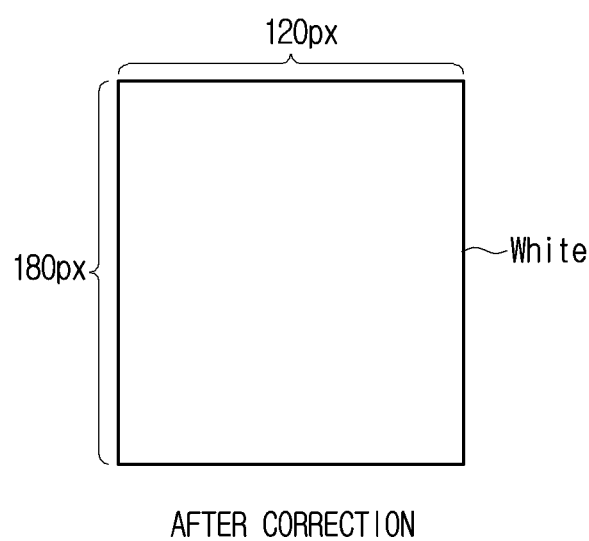

FIG. 5 is a diagram for illustrating a gradation effect according to an embodiment of the disclosure.

Referring to FIG. 5, it illustrates an example case wherein the display module 131 outputs a white image as a test image. Although the characteristics of the plurality of LED pixels included in the display module 131 are changed (i.e., although the aging degree changes) as the accumulated use time of the display device 100 increases, if each of the plurality of LED pixels outputs a white image based on the basic correction coefficient set in the initial stage (or, the manufacturing step), there is a problem that each of the LEDs unintentionally outputs a degraded and distorted color (e.g. the red color in FIG. 5). Here, a degraded and distorted color will be generally referred to as a first color, for the convenience of explanation.

As illustrated in FIG. 5, distinction between an area wherein the first color is output and an area wherein the first color is not output is not clear, and in proportion to the accumulated use time of the display device 100, an area wherein changes of the characteristics of the LED pixels occurred heavily may output the first color in high strength, and the remaining areas wherein changes of the characteristics occurred only lightly may output the first color in low strength.

While the display module 131 according to an embodiment outputs a white test image, a degradation and distortion phenomenon of outputting a gradation effect as if based on the first color may occur, as illustrated in FIG. 5.

According to an embodiment, the processor 140 may generate a gradation effect for outputting a color that is in a complementary relation with the first color currently being output by the display module 131 in high strength in one area, and outputting the color in low strength in the remaining areas. Here, the color that is in a complementary relation will be generally referred to as a second color, for the convenience of explanation. It is noted that the case wherein the relation between the first color and the second color is a complementary relation is merely an example, and the disclosure is not limited thereto. For example, if the display panel 130 is outputting a white test image, the second color may mean a color wherein a white image is generated when the color is mixed with the first color, or a color that offsets the first color and makes a white image output in the same color and luminance as another display module.

In summary, using one or more of the above techniques, the processor 140 may control the display module 131 such that a white image is output in the same color and luminance in all areas of the display module 131 through mixing of a gradation effect based on the first color and a gradation effect based on the second color.

For example, the processor 140 may obtain a correction coefficient making pixels corresponding to one area outputting the first color in high strength output the second color that is in a complementary relation with the first color in high strength. Also, the processor 140 may obtain a correction coefficient making pixels corresponding to the remaining areas outputting the first color in low strength output the second color in low strength. When the display module 131 outputs the gradation effect based on the second color according to control by the processor 140, the gradation effect based on the first color can be offset, and a test image can be output in the same color and luminance in all areas of the display module 131, and uniformity with another display module can be improved.

Hereinafter, a method for the display module 131 to obtain correction coefficients of the plurality of respective pixels included in the display module 131 for outputting a gradation effect will be described.

The processor 140 according to an embodiment of the disclosure may receive position information and a corrected pixel value of one area (for example, a selected area) in the display module 131 from the external electronic device 200. Here, the position information of the one area may be information indicating any one of a plurality of predetermined areas in the display module 131.

For example, if position information indicating any one of four areas 10-1 to 10-4 in the display module 131 is received from the electronic device 200, the processor 140 may identify one area among the four areas 10-1 to 10-4 based on the received position information. Hereinafter, unless otherwise specified, it will be assumed that the processor 140 identified the first area 10-1 among the four areas 10-1 to 10-4 based on position information, for the convenience of explanation.

Then, the processor 140 may obtain a correction coefficient corresponding to at least one pixel based on the corrected pixel value and an output pixel value of at least one pixel corresponding to the first area 10-1 received from the electronic device 200. For example, the processor 140 may obtain a correction coefficient making at least one pixel corresponding to the first area 10-1 output a corrected pixel value. Here, the corrected pixel value may mean the second color.

For example, if pixels corresponding to the second and fourth areas 10-2, 10-4 are outputting the first color in high strength, the processor 140 may obtain correction coefficients making the pixels corresponding to the second and fourth areas 10-2, 10-4 output the second color in high strength. Thus, when the pixels corresponding to the second and fourth areas 10-2, 10-4 output the second color in high strength, the processor 140 may offset the strength of the first color that is unintentionally output due to the aging degree or the characteristics of the pixels corresponding to the second and fourth areas 10-2, 10-4, and provide a white image in the same color and luminance as the remaining areas.

The processor 140 may also obtain correction coefficients corresponding to the respective remaining pixels excluding the pixels corresponding to one area (e.g., the first area 10-1) among the plurality of pixels in the display module 131. As an example, the processor 140 may obtain correction coefficients corresponding to the respective remaining pixels based on the distance between the respective remaining pixels and the at least one pixel corresponding to the first area 10-1 constituting the display module 131.

According to an embodiment, the processor 140 may obtain gain values corresponding to the respective remaining pixels to be inversely proportional to the distance between the respective remaining pixels and the at least one pixel corresponding to the first area 10-1 constituting the display module 131. Then, the processor 140 may obtain correction coefficients corresponding to the respective remaining pixels by applying the obtained gain values to the basic correction coefficients corresponding to the respective remaining pixels.

For example, the processor 140 may obtain correction coefficients corresponding to the respective remaining pixels that make the respective remaining pixels output the second color in low strength as their distance from the first area 10-1 becomes farther.

The processor 140 according to an embodiment of the disclosure may generate a gradation effect to a corrected pixel value corresponding to each of at least two areas among the first to fourth areas 10-1 to 10-4.

As an example, the processor 140 may receive position information and a corrected pixel value of another area other than one area in the display module 131 from the electronic device 200. Then, the processor 140 may identify at least one pixel corresponding to the another area in the display module 131 based on the received position information, and obtain a correction coefficient corresponding to at least one pixel corresponding to the another area. Then, the processor 140 may obtain correction coefficients corresponding to the respective remaining pixels constituting the display module 131 based on the correction coefficient corresponding to the at least one pixel corresponding to the one area and the correction coefficient corresponding to the at least one pixel corresponding to the another area.

For example, if an A color is received as a corrected pixel value of a pixel corresponding to the first area 10-1, and a B color is received as a corrected pixel value of a pixel corresponding to the third area 10-3 from the electronic device 200, the processor 140 may obtain a correction coefficient making the pixel corresponding to the first area 10-1 output the A color in high strength, and obtain a correction coefficient making the pixel corresponding to the third area 10-3 output the B color in high strength.

Also, the processor 140 may obtain a correction coefficient making a C color be output wherein the A color and the B color are mixed based on the ratio of the distance that the respective remaining pixels are distanced from the first area 10-1 and the distance that the respective remaining pixels are distanced from the third area 10-3.

As another example, a case wherein the A color was received as a corrected pixel value of a pixel corresponding to the first area 10-1, and corrected pixel values of pixels corresponding to the respective second to fourth areas 10-2 to 10-4 were not separately received from the electronic device 200 may be assumed. In this case, the processor 140 may obtain a correction coefficient making the pixel corresponding to the first area 10-1 output the A color in high strength, and obtain correction coefficients making the respective remaining pixels output the A color in low strength as their distance from the first area 10-1 becomes farther, and making the pixels corresponding to the respective second to fourth areas 10-2 to 10-4 output a color corresponding to the test image. For example, while the display panel 130 outputs a white image, the pixels corresponding to the respective second to fourth areas 10-2 to 10-4 may output the white image based on the basic correction coefficients.

However, this is merely an example, and the processor 140 can obtain correction coefficients corresponding to the plurality of respective pixels included in the display module 131 by using various conventional gradation generation algorithms.

FIG. 5 illustrates an example case wherein a plurality of predetermined areas in the display module 131 fall under four vertex areas of the display module 131, i.e., the first to fourth areas 10-1 to 10-4, and wherein one area is one vertex area in the display module 131, and the other areas are the remaining vertex areas in the display module 131, for the convenience of explanation. However, this is merely an example, and the disclosure is not limited thereto. For example, the plurality of predetermined areas can be changed in various ways according to the number of the plurality of sub areas in the display module 131.

Hereinafter, a method of selecting one area and a corrected pixel value in the display module 131 will be described.

Figure 6:
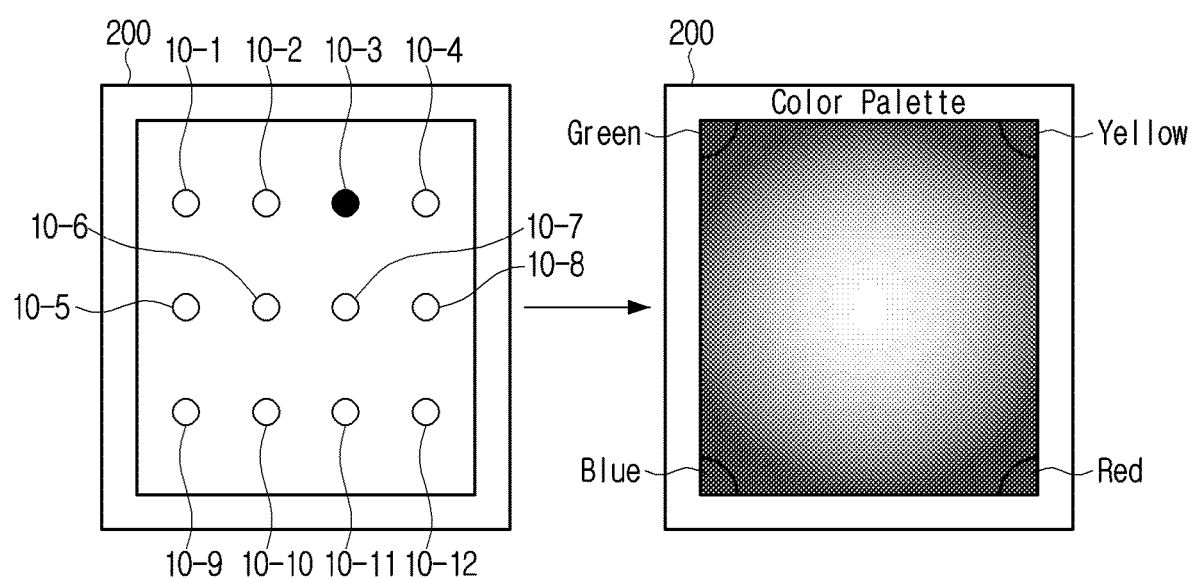
FIG. 6 is a diagram for illustrating position information and a corrected pixel value according to an embodiment of the disclosure.

FIG. 6 is a diagram for illustrating position information and a corrected pixel value according to an embodiment of the disclosure.

The electronic device 200 may display a first guide UI that can select any one of the plurality of display modules 131-1, . . . , 131-n included in the display panel 130. For example, the electronic device 200 may sequentially display a guide UI (not depicted) that can select any one of sixty-four cabinets in total included in the display panel 130 of an 8K resolution, and a guide UI (not depicted) that can select any one of six display modules 131 included in the selected cabinets.

When any one of the plurality of display modules is selected according to a user input, the electronic device 200 may display a second guide UI that can select one area 10 among a plurality of areas 10-1, 10-2, etc. in the selected one display module 131, as illustrated in FIG. 6.

Figure 7:
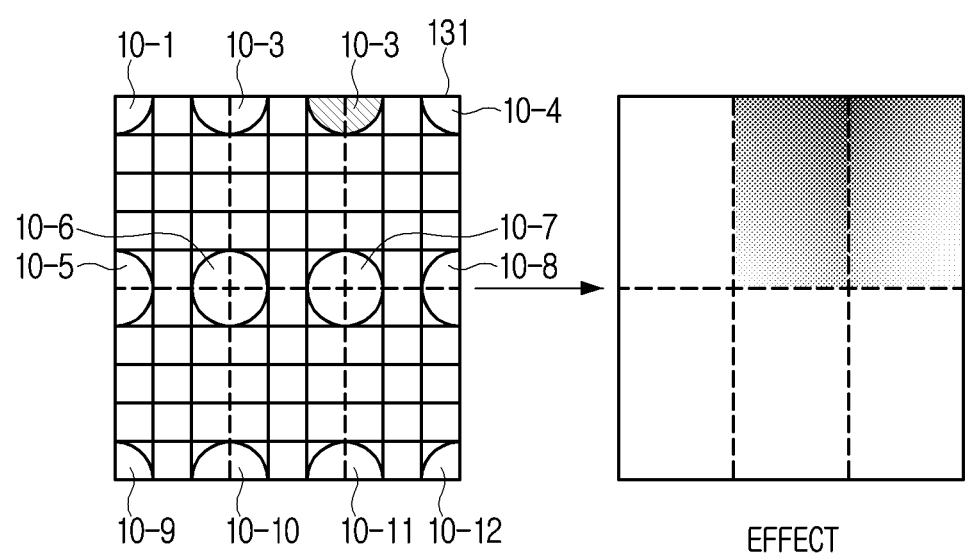
FIG. 7 is a diagram for illustrating a plurality of areas and a gradation effect according to an embodiment of the disclosure.

For example, FIG. 7 is a diagram for illustrating a plurality of areas and a gradation effect according to an embodiment of the disclosure. Referring to FIG. 7, the diagram illustrates an example case wherein the display module 131 includes six sub areas or virtual areas in total, and wherein the electronic device 200 displays a second guide UI that can select any one of predetermined twelve areas, according to an embodiment of the disclosure. Detailed explanation in this regard will be described with reference to FIG. 8.

Figure 8:
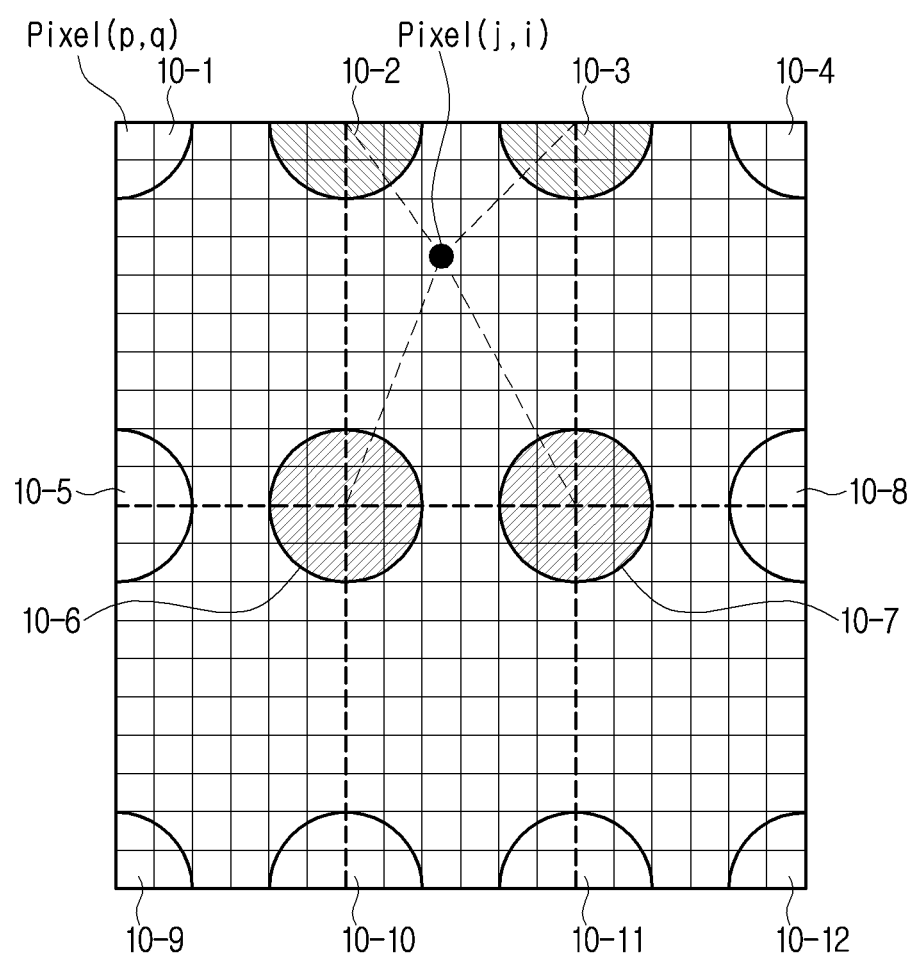
FIG. 8 is a diagram for illustrating correction coefficients for a plurality of pixels according to an embodiment of the disclosure.

FIG. 8 is a diagram for illustrating correction coefficients for a plurality of pixels according to an embodiment of the disclosure. Referring to FIG. 8, the diagram illustrates an example case wherein the size of one display module 131 is 120×180, and the display module 131 includes six sub areas in total divided in a unit of 40×90. Referring to FIG. 8, each of the first area 10-1, the second area 10-2, the fifth area 10-5, and the sixth area 10-6 corresponds to a vertex area of a first sub area among the six sub areas. Also, each of the second area 10-2, the third area 10-3, the sixth area 10-6, and the seventh area 10-7 corresponds to a vertex area of a second sub area among the six sub areas. In addition, each of the third area 10-3, the fourth area 10-4, the seventh area 10-7, and the eight area 10-8 corresponds to a vertex area of a third sub area among the six sub areas. As described above, if the display module 131 includes six sub areas, the vertex areas of the respective sub areas may be selectable areas 10, and twelve areas 10-1 to 10-12 in total may be selectable areas. However, this is merely an example, and the disclosure is not limited thereto, and the display module 131 can include sub areas in various numbers and selectable areas in various numbers.

FIG. 6 illustrates an example case wherein the third area is selected among the first to twelfth areas 10-1 to 10-12, for the convenience of explanation.

If at least one of the plurality of predetermined areas is selected according to a user input, the electronic device 200 may display a color palette UI that can select a corrected pixel value of a pixel corresponding to the selected area.

As another example, the electronic device 200 may transmit one area selected by a user and a first corrected pixel value corresponding to the one area, and another area and a second corrected pixel value corresponding to the another area to the display device 100.

Then, when the first corrected pixel value of the one area and the second corrected pixel value of the another area are received, the display device 100 may identify a first pixel corresponding to the one area and a second pixel corresponding to the another area.

Then, the processor 140 may obtain a first correction coefficient corresponding to the first pixel and a second correction coefficient corresponding to the second pixel based on the first corrected pixel value and the second corrected pixel value.

Then, the processor 140 may obtain correction coefficients corresponding to the respective remaining pixels included in the sub areas based on the first correction coefficient and the second correction coefficient. Detailed explanation in this regard will be described with reference to FIG. 7.

Referring again to FIG. 7, it illustrates an example case wherein position information and corrected pixel values of the third area 10-3 have been received. The processor 140 may identify pixels corresponding to the third area 10-3 in each of the second sub area and the third sub area corresponding to the third area 10-3.

Then, the processor 140 may obtain correction coefficients making the identified pixels output corrected pixel values. Accordingly, the pixels corresponding to the third area 10-3 may output corrected pixel values in high strength.

The processor 140 may obtain correction coefficients of the respective remaining pixels included in the second sub area based on the correction coefficients of the pixels corresponding to the third area 10-3. Accordingly, the remaining pixels included in the second sub area may output the corrected pixel values in low strength. The corrected pixel values may be pixel values corresponding to the color that is in a complementary relation with the degraded and distorted color that is unintentionally output according to the change of the aging degree or the characteristics of the pixels corresponding to the third area 10-3.

Also, the processor 140 can obtain correction coefficients of the respective remaining pixels included in the third sub area based on the correction coefficients of the pixels corresponding to the third area 10-3. When position information and corrected pixel values of one area are received from the electronic device 200, the processor 140 may generate a gradation effect as illustrated in FIG. 7. Accordingly, the processor 140 may offset the degraded and distorted color that is unintentionally output according to the change of the characteristics of some LED pixels among the plurality of LED pixels included in the display module 131, and thereby control the display module 131 to output the same color in the same luminance. Also, the processor 140 may improve uniformity with another display module.

Referring again to FIG. 8, the diagram illustrates an example case wherein the number of the plurality of sub areas is six, and the number of the plurality of predetermined areas is twelve in the display module 131, for the convenience of explanation. That is, the display module 131 may include six sub areas, and first area 10-1 to twelfth area 10-12 which are selectable.

Then, when the first corrected pixel value of one area and the second corrected pixel value of another area included in one sub area among the plurality of sub areas in the display module 131 are received, the processor 140 may identify the first pixel corresponding to the one area and the second pixel corresponding to the another area. Referring to FIG. 8, the processor 140 may identify pixels corresponding to the respective second area 10-2 and third area 10-3 included in the second sub area.

Then, the processor 140 may identify the first correction coefficient of the first pixel corresponding to the one area based on the first corrected pixel value, and identify the second correction coefficient of the second pixel corresponding to the another area based on the second corrected pixel value. Referring to FIG. 8, the processor 140 may obtain a correction coefficient of a pixel corresponding to the second area 10-2 based on the corrected pixel value of the second area 10-2, and obtain a correction coefficient of a pixel corresponding to the third area 10-3 based on the corrected pixel value corresponding to the third area 10-3.

Then, the processor 140 may obtain correction coefficients corresponding to the respective remaining pixels included in one sub area (for example, a selected sub area) based on the first and second correction coefficients. For example, the processor 140 may obtain gain values corresponding to the respective remaining pixels based on the distance between the first pixel corresponding to the one area and the respective remaining pixels included in the one sub area, and the distance between the second pixel corresponding to the another area and the respective remaining pixels included in the one sub area.

Then, the processor 140 may obtain correction coefficients corresponding to the respective remaining pixels by applying the gain values to the basic correction coefficients corresponding to the respective remaining pixels.

For the convenience of explanation, a method of obtaining correction coefficients of the respective remaining pixels included in one sub area will be described with reference to FIG. 8.

Referring to FIG. 8, the processor 140 may identify the distance between a specific pixel (Pixel (j, i)) and the second area 10-2, the distance between the specific pixel and the third area 10-3, the distance between the specific pixel and the sixth area 10-6, and the distance between the specific pixel and the seventh area 10-7, in the second sub area of the display module 131. Then, the processor 140 may obtain a ratio based on the plurality of identified distances, and mix the corrected pixel value of the second area 10-2, the corrected pixel value of the third area 10-3, the corrected pixel value of the sixth area 10-6, and the corrected pixel value of the seventh area 10-7 based on the obtained ratio. Corrected pixel values of other areas not received from the electronic device 200 may be set based on a test image. For example, if the corrected pixel values of the second area 10-2 and the third area 10-3 are received, and the corrected pixel values of the sixth area 10-6 and the seventh area 10-7 are not received from the electronic device 200, and the display panel 130 is outputting a white test image, the processor 140 may identify the corrected pixel values of the sixth area 10-6 and the seventh area 10-7 based on the white image. As another example, the processor 140 may identify the correction coefficients of the pixels corresponding to the respective sixth area 10-6 and seventh area 10-7 based on the basic correction coefficients. The corrected pixel values can include various values such as color values, the transparency (or, the strength) of colors, luminance value, etc.

A method of obtaining correction coefficients of a plurality of respective pixels in one sub area based on a mathematical formula will be described.

Referring to FIG. 8, the coordinates of the pixel located in the left uppermost end of the display module 131 will be denoted as (p, q), and the coordinates of a specific pixel of which correction coefficient is to be obtained by the processor 140 will be denoted as (j, i). Then, a case wherein six sub areas are arranged in a 3×2 matrix to form one display module 131 will be assumed. That is, if the size of the sub area is m×n, the size of the display module is 3m×2n.

In this case, the processor 140 may obtain the gain value of the specific pixel (Pixel (j, i)) based on the following Formulae 1 to 3.

$$cv1=\{(i-q)*C(n+5)+(q+n-i)*C(n+1)\}/n \quad \text{[Formula 1]}$$

$$cv2=\{(i-q)*C(n+6)+(q+n-i)*C(n+2)\}/n \quad \text{[Formula 2]}$$

$$\text{Gain}=\{(j-(p+m))*cv2+((p+(2*m)-j)*cv1\}/m \quad \text{[Formula 3]}$$

Here, C(n+1) may be the corrected pixel value of the second area 10-2, C(n+2) may be the corrected pixel value of the third area 10-3, C(n+5) may be the corrected pixel value of the sixth area 10-6, and C(n+6) may be the corrected pixel value of the seventh area 10-7. For the convenience of explanation, the above explanation described an example case of obtaining the gain value of the specific pixel (Pixel (j, i)) in the second sub area, but this is merely an example, and the disclosure is not limited thereto.

Then, the processor 140 may obtain the correction coefficient corresponding to the specific pixel by applying the obtained gain value to the basic correction coefficient. The processor 140 may store the correction coefficient in the memory 120, and process an input image based on the stored correction coefficient, and provide the image through the display panel 130.

According to an embodiment, the method for the processor 140 to obtain a correction coefficient corresponding to a specific pixel by applying an obtained gain value to the basic correction coefficient may be expressed as the following Formula 4.

$$\text{Output}=(\text{Input}*\text{Gain})/(16384) \quad \text{[Formula 4]}$$

Here, a case wherein the gain value Gain is 15 bit and is a value within the range of 0 to 32767 is assumed, but this is merely an example, and the disclosure is not limited thereto. The Input is a basic correction coefficient corresponding to the specific pixel, and the Output may indicate the newly obtained correction coefficient corresponding to the specific pixel.

Figure 9:
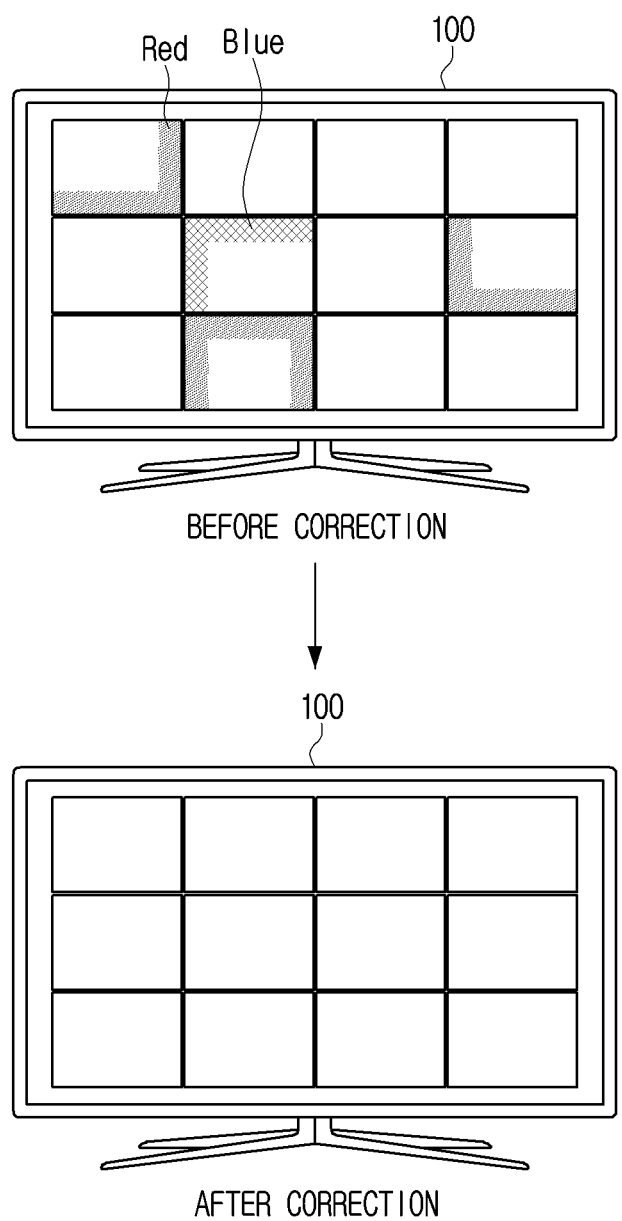
FIG. 9 is a diagram for illustrating a correction effect according to an embodiment of the disclosure.

FIG. 9 is a diagram for illustrating a correction effect according to an embodiment of the disclosure.

Referring to FIG. 9, the processor 140 may output a test image in the same color and luminance as another display module by applying a gradation effect to at least one display module 131 among the plurality of display modules 131-1, . . . , 131-n.

The display device 100 according to an embodiment of the disclosure may include a power supply part (not shown) arranged on the rear surface of one display module 131 (for example, a selected display module) among the plurality of display modules 131-1, . . . , 131-n. The characteristics of the display module 131 may be changed according to heat generation of the power supply part in proportion to the accumulated use time of the display device 100. In this case, the processor 140 may obtain correction coefficients correcting color temperatures of the pixel values of the plurality of respective pixels included in the one display module 131, for compensating color distortion due to heat generation of the power supply part.

The processor 140 according to an embodiment of the disclosure may control the display panel 130 such that the one display module 131 outputs a guide image during a threshold time based on position information of one area in the one display module 131.

As an example, when position information of one area is received from the electronic device 200, the processor 140 may identify one display module 131 including the one area among the plurality of display modules 131-1, . . . , 131-n based on the position information. Then, the processor 140 may control the display panel 130 such that the identified display module 131 outputs a guide image during a threshold time. Here, the guide image may mean an image wherein all pixels in the display module 131 flicker twice or three times in a specific color, and the like. However, this is merely an example, and the disclosure is not limited thereto. As the plurality of display modules 131-1, . . . , 131-n implement the display device 100 by being connected with one another, from the user's viewpoint, it may be rather difficult to identify one display module 131 from which correction coefficient is to be obtained among the plurality of display modules 131-1, . . . , 131-n. If the one display module 131 from which correction coefficient is to be obtained outputs a guide image as position information and a corrected pixel value are received from the electronic device 200 according to an embodiment, from the user's viewpoint, the location of the one display module 131 among the plurality of display modules 131-1, . . . , 131-n can be identified more easily.

FIG. 10 is a flow chart for illustrating a control method for a display device according to an embodiment of the disclosure.

First, a display panel including a plurality of display modules is controlled to display a test image in operation S1010.

Then, while the test image is being displayed, position information and a corrected pixel value of one ("a first") area in one ("a first") display module among the plurality of display modules are received from an external electronic device in operation S1020.

Then, at least one pixel corresponding to the first area in the first display module is identified based on the received position information in operation S1030.

Then, a correction coefficient corresponding to the at least one pixel is obtained based on the received corrected pixel value and an output pixel value of the identified at least one pixel in operation S1040.

Then, correction coefficients corresponding to each of a plurality of remaining pixels (that is, pixels other than the at least one pixel identified at S1030) in the selected display module are obtained based on the obtained correction coefficient and the distances between the respective remaining pixels and the identified at least one pixel, and are stored in operation S1050.

Then, an input image is processed based on the stored correction coefficients, and the processed input image is displayed in operation S1060.

Here, the display device may include or store basic correction coefficients corresponding to the plurality of respective pixels, and the operation S1050 of obtaining the correction coefficients may include obtaining gain values corresponding to each of the plurality of remaining pixels based on the distance between the respective remaining pixels and the identified at least one pixel, and applying each of the gain values to the basic correction coefficients corresponding to the respective remaining pixels, to thereby obtain the correction coefficients corresponding to the respective remaining pixels.

Here, the gain values may be inversely proportional to the distance between the respective remaining pixels and the identified at least one pixel.

Also, at operation S1020, the device may further receive position information and a corrected pixel value of another ("a second") area in the first display module other than the first area, and the operations S1040 and S1050 of obtaining the correction coefficients may include identifying at least one pixel corresponding to the second area based on the received position information, obtaining a correction coefficient corresponding to the at least one pixel corresponding to the second area, and obtaining correction coefficients corresponding to each of the plurality of remaining pixels based on the correction coefficient corresponding to the at least one pixel corresponding to the first area and the correction coefficient corresponding to the at least one pixel corresponding to the second area.

Also, the first area and the second area may be vertex areas in the first display module.

In addition, the first display module may include a plurality of sub areas, and the operations S1040 and S1050 of obtaining the correction coefficients may include, based on receiving a first corrected pixel value of the first area and a second corrected pixel value of a second area each corresponding to one ("a first") sub area of the plurality of sub areas, identifying a first pixel corresponding to the first area and a second pixel corresponding to the second area, obtaining a first correction coefficient corresponding to the first pixel and a second correction coefficient corresponding to the second pixel based on the first corrected pixel value and the second corrected pixel value, and obtaining the correction coefficients corresponding to each of the plurality of remaining pixels included in the first sub area based on the first correction coefficient and the second correction coefficient.

Here, the display device may include or store basic correction coefficients each of corresponding to the plurality of remaining pixels included in the first sub area, and the operation S1050 of obtaining the correction coefficients may include obtaining gain values corresponding to the respective remaining pixels based on a distance between the first pixel and the respective remaining pixels included in the first sub area, and a distance between the second pixel and the respective remaining pixels included in the first sub area, and applying the gain values to the basic correction coefficients corresponding to the respective remaining pixels, to thereby obtain the correction coefficients corresponding to the respective remaining pixels.

According to an embodiment of the disclosure, a power supply part may be arranged on the rear surface of the first display module, and the correction coefficients may correct the color temperatures of the pixel values of each of the plurality of remaining pixels included in the first display module, for compensating color distortion due to heat generation of the power supply part.

The control method according to an embodiment of the disclosure may further include controlling the display panel such that the first display module outputs a guide image during a threshold time based on position information of the first area in the first display module.

Also, the external electronic device may display a guide UI configured to schematize arrangement states of the respective display modules included in the display panel, and based on receiving a user input selecting one area in one display module among the plurality of display modules on the guide UI, may display a color palette UI for correcting the pixel values of the first area.

The various embodiments of the disclosure can be applied not only to display devices, but also to all types of electronic devices including displays.

The various embodiments described above may be implemented in a recording medium that can be read by a computer or a device similar to a computer, by using software, hardware, or a combination thereof. In some cases, the embodiments described in this specification may be implemented as a processor itself. According to implementation by software, the embodiments such as procedures and functions described in this specification may be implemented as separate software modules. Each of the software modules can perform one or more functions and operations described in this specification.

Computer instructions for performing processing operations of the display device 100 and/or electronic device 200 according to the aforementioned various embodiments of the disclosure may be stored in a non-transitory computer-readable medium. Computer instructions stored in such a non-transitory computer-readable medium make the processing operations at the display device 100 and/or electronic device 200 according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

While preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A display device comprising:
a communicator;
a memory;
a display panel including a plurality of display modules; and
one or more processors configured to:
control the display panel to display a test image,
while the test image is being displayed, receive position information and a corrected pixel value of a first area in a first display module among the plurality of display modules from an external electronic device through the communicator and receive position information and a corrected pixel value of a second area in the first display module other than the first area,
based on the received position information, identify at least one pixel corresponding to the first area in the first display module and identify at least one pixel corresponding to the second area in the first display module other than the first area,
obtain a correction coefficient corresponding to the at least one pixel corresponding to the first area based on the received corrected pixel value and an output pixel value of the identified at least one pixel corresponding to the first area and obtain a correction coefficient corresponding to the at least one pixel corresponding to the second area in the first display module other than the first area,
obtain correction coefficients corresponding to each of a plurality of remaining pixels in the first display module based on the obtained correction coefficient and a distance between the respective remaining pixels and the identified at least one pixel,
store the correction coefficients in the memory,
process an input image based on the stored correction coefficients, and
control the display panel to display the processed input image,
wherein the one or more processors are further configured to:
obtain the correction coefficients corresponding to each of the plurality of remaining pixels based on the correction coefficient corresponding to the at least one pixel corresponding to the first area and the correction coefficient corresponding to the at least one pixel corresponding to the second area.

2. The display device of claim 1,
wherein the memory stores basic correction coefficients corresponding to each of the plurality of remaining pixels, and
the one or more processors are configured to obtain the correction coefficients corresponding to each of the plurality of remaining pixels by:
obtaining gain values corresponding to each of the plurality of remaining pixels based on the distance between the respective remaining pixels and the identified at least one pixel, and
applying each of the gain values to the basic correction coefficients corresponding to the respective remaining pixels.

3. The display device of claim 2,
wherein the gain values corresponding to each of the plurality of remaining pixels are obtained to be inversely proportional to the distance between the respective remaining pixels and the identified at least one pixel.

4. The display device of claim 1,
wherein the first area and the second area are vertex areas in the first display module.

5. The display device of claim 1,
wherein the first display module includes a plurality of sub areas, and
the one or more processors are further configured to:
based on receiving a first corrected pixel value of the first area and a second corrected pixel value of a second area each corresponding to a first sub area of the plurality of sub areas, identify a first pixel corresponding to the first area and a second pixel corresponding to the second area,
obtain a first correction coefficient corresponding to the first pixel and a second correction coefficient corresponding to the second pixel based on the first corrected pixel value and the second corrected pixel value, and
obtain the correction coefficients corresponding to each of the plurality of remaining pixels included in the first sub area based on the first correction coefficient and the second correction coefficient.

6. The display device of claim 5,
wherein the memory stores basic correction coefficients corresponding to each of the plurality of remaining pixels included in the first sub area, and
the one or more processors are configured to obtain the correction coefficients corresponding to each of the plurality of remaining pixels by:
obtaining gain values corresponding to the respective remaining pixels based on a distance between the first pixel and the respective remaining pixels included in the first sub area, and a distance between the second pixel and the respective remaining pixels included in the first sub area, and
applying the gain values to the basic correction coefficients corresponding to the respective remaining pixels.

7. The display device of claim 1,
wherein a power supply part is arranged on a rear surface of the first display module, and
the correction coefficients correct color temperatures of pixel values of each of the plurality of remaining pixels included in the first display module for compensating color distortion due to heat generation of the power supply part.

8. The display device of claim 1,
wherein the one or more processors are further configured to:
based on the position information of the first area in the first display module, control the display panel such that the first display module outputs a guide image during a threshold time.

9. The display device of claim 1,
wherein the external electronic device displays a guide UI configured to:
schematize arrangement states of the respective display modules included in the display panel, and
based on receiving a user input selecting one area in one display module among the plurality of display modules on the guide UI, display a color palette UI for correcting pixel values of the first area.

10. A control method for a display device including a display panel, the display panel including a plurality of display modules, the method comprising:
 controlling the display panel to display a test image;
 while the test image is being displayed, receiving position information and a corrected pixel value of a first area in a first display module among the plurality of display modules from an external electronic device and receiving position information and a corrected pixel value of a second area in the first display module other than the first area;
 based on the received position information, identifying at least one pixel corresponding to the first area in the first display module and identifying at least one pixel corresponding to the second area in the first display module other than the first area;
 obtaining a correction coefficient corresponding to the at least one pixel based on the received corrected pixel value and an output pixel value of the identified at least one pixel corresponding to the first area and obtaining a correction coefficient corresponding to the at least one pixel corresponding to the second area other than the first area;
 obtaining correction coefficients corresponding to each of a plurality of remaining pixels in the first display module based on the obtained correction coefficient and a distance between the respective remaining pixels and the identified at least one pixel;
 storing the correction coefficients;
 processing an input image based on the stored correction coefficients; and
 displaying the processed input image,
 wherein the obtaining of the correction coefficients corresponding to each of the plurality of remaining pixels comprises:
 obtaining correction coefficients corresponding to each of the plurality of remaining pixels based on the correction coefficient corresponding to the at least one pixel corresponding to the first area and the correction coefficient corresponding to the at least one pixel corresponding to the second area.

11. The control method of claim 10,
 wherein the display device further includes basic correction coefficients corresponding to each of the plurality of remaining pixels, and
 the obtaining of the correction coefficients corresponding to each of the plurality of remaining pixels comprises:
 obtaining gain values corresponding to each of the plurality of remaining pixels based on the distance between the respective remaining pixels and the identified at least one pixel; and
 applying each of the gain values to the basic correction coefficients corresponding to the respective remaining pixels.

12. The control method of claim 11,
 wherein the gain values corresponding to each of the plurality of remaining pixels are obtained to be inversely proportional to the distance between the respective remaining pixels and the identified at least one pixel.

13. The control method of claim 10,
 wherein the first area and the second area are vertex areas in the first display module.

14. The control method of claim 10,
 wherein the first display module includes a plurality of sub areas, and
 the obtaining of the correction coefficients comprises:
 based on receiving a first corrected pixel value of the first area and a second corrected pixel value of a second area each corresponding to a first sub area of the plurality of sub areas, identifying a first pixel corresponding to the first area and a second pixel corresponding to the second area,
 obtaining a first correction coefficient corresponding to the first pixel and a second correction coefficient corresponding to the second pixel based on the first corrected pixel value and the second corrected pixel value, and
 obtaining the correction coefficients corresponding to each of the plurality of remaining pixels included in the first sub area based on the first correction coefficient and the second correction coefficient.

15. The control method of claim 14,
 wherein the display device further includes basic correction coefficients corresponding to each of the plurality of remaining pixels included in the first sub area, and
 the obtaining of the correction coefficients comprises:
 obtaining gain values corresponding to the respective remaining pixels based on a distance between the first pixel and the respective remaining pixels included in the first sub area, and a distance between the second pixel and the respective remaining pixels included in the first sub area, and
 applying the gain values to the basic correction coefficients corresponding to the respective remaining pixels.

16. The control method of claim 10,
 wherein a power supply part is arranged on a rear surface of the first display module, and
 the correction coefficients correct color temperatures of pixel values of each of the plurality of remaining pixels included in the first display module for compensating color distortion due to heat generation of the power supply part.

17. The control method of claim 10, further comprising, based on the position information of the first area in the first display module, controlling the display panel such that the first display module outputs a guide image during a threshold time.

18. The control method of claim 10,
 wherein the external electronic device displays a guide UI configured to:
 schematize arrangement states of the respective display modules included in the display panel, and
 based on receiving a user input selecting one area in one display module among the plurality of display modules on the guide UI, display a color palette UI for correcting pixel values of the first area.

* * * * *